(12) United States Patent
Tanida

(10) Patent No.: US 7,624,186 B2
(45) Date of Patent: Nov. 24, 2009

(54) IMAGE PROCESSING SYSTEM HAVING MANAGEMENT APPARATUS WITH PROCESSING SECTION

(75) Inventor: Mio Tanida, Hiratsuka (JP)

(73) Assignee: Konica Minolta Business Technologies, Inc., Japan ( * ) Notice: Subject to any disclaimer, the term of this patent is extended or adjusted under 35 U.S.C. 154(b) by 621 days.

(21) Appl. No.: 11/297,930

(22) Filed: Dec. 8, 2005

(65) Prior Publication Data
US 2007/0050050 A1 Mar. 1, 2007

(30) Foreign Application Priority Data
Aug. 31, 2005 (JP) ............................. 2005-251822

(51) Int. Cl.
*G06F 15/16* (2006.01)
(52) U.S. Cl. ...................... 709/228; 709/227
(58) Field of Classification Search ................. 709/201, 709/213, 217, 226, 231, 227, 228
See application file for complete search history.

(56) References Cited

U.S. PATENT DOCUMENTS

| | | | | |
|---|---|---|---|---|
| 5,568,402 | A * | 10/1996 | Gray et al. ................... | 709/224 |
| 5,935,217 | A * | 8/1999 | Sakai et al. .................. | 709/249 |
| 6,029,198 | A * | 2/2000 | Iizuka ........................ | 709/223 |
| 6,345,319 | B2 * | 2/2002 | Lin et al. ..................... | 710/8 |
| 6,487,600 | B1 * | 11/2002 | Lynch ........................ | 709/229 |
| 7,383,315 | B2 * | 6/2008 | Pierce et al. ................. | 709/217 |

FOREIGN PATENT DOCUMENTS

| | | |
|---|---|---|
| JP | 2003-30069 | 1/2003 |
| JP | 2003-30070 | 1/2003 |
| JP | 2003-189021 | 7/2003 |
| JP | 2005-246795 | 9/2005 |

OTHER PUBLICATIONS

Notification of Reasons For Refusal for Patent Application No. 2005-251822 mailed Aug. 8, 2007.

* cited by examiner

*Primary Examiner*—Saleh Najjar
*Assistant Examiner*—Marie Georges Henry
(74) *Attorney, Agent, or Firm*—Cantor Colburn LLP

(57) ABSTRACT

An information processing system, which processes information based on setting information, having: a first apparatus; a second apparatus; and a management apparatus, wherein the first apparatus includes sections which transmit a first device information and a first setting information to the management apparatus; the management apparatus includes sections to store the information associated with the first device information; the second apparatus includes a section which transmits a second device information to the management apparatus, an section to inquire about the first setting information to the management apparatus, and a display; and the management apparatus further includes a processing section which specifies a difference between the first and the second device information, and modifies the first setting information according with the difference, and a section which transmits a modified first setting information, wherein the display section displays the result of the inquiry.

21 Claims, 8 Drawing Sheets

WITH DUPLEX

IMAGE PROCESSING SYSTEM HAVING MANAGEMENT APPARATUS WITH PROCESSING SECTION

RELATED APPLICATION

This application is based on Japanese Patent Application No. 2005-251822 filed with Japan Patent Office on Aug. 31, 2005, the entire content of which is hereby incorporated by reference.

BACKGROUND

1. Field of the Invention

An embodiment of the present invention relates to information processing systems in which it is possible to share the setting information prepared by a user among a plurality of apparatuses, and in particular to the technology of sharing setting information among apparatuses with different capacities and functions.

2. Description of Related Art

In digital copying machines, etc., the user can make various types of settings such as copying the original with enlarging it, or reducing several sheets of the original and lay them out in a single sheet of paper, etc. In order to reduce the labor of making such settings every time, many apparatuses are provided with the function of registering the contents of settings used frequently as setting information and recalling such setting information and using it again.

Further, since copying machines and facsimile machines are very often shared among several people, there are apparatuses which have been configured so that the display format of the operating panel or the usable functions can be changed depending on the user. For example, in the apparatus disclosed in Unexamined Japanese Patent Application Publication No. 2003-189021, the eyesight and level of skill, etc., are registered in a server as the individual information, the user is authenticated when an apparatus connected to this server is used, the individual information of the authenticated user is downloaded from the server and the display format of the operating panel, etc., are changed automatically.

Patent Document 1: Unexamined Japanese Patent Application Publication No. 2003-189021

In a conventional apparatus, the setting information, etc. for each user is stored in the memory of the apparatus in which it was prepared, and could only be used in the apparatus in which it was prepared. Therefore, when a person has to use an apparatus that is in a department other than the one that person uses normally, it was very inconvenient because the person has to carry out all the setting operations of the job all over again.

In the apparatus disclosed in Unexamined Japanese Patent Application Publication No. 2003-189021, although the individual information is registered in a server and, upon user authentication, the information of that user is downloaded and used in the apparatus, the contents registered in the server are the eyesight, level of skill, etc. and is not intended for setting information that specify the operating conditions, etc. of jobs.

Even if the configuration is such that the setting information of jobs is registered in a server and is called from the apparatus side, since the capacity and functions of the calling apparatus differs depending on its type, very often it is not possible to use the setting information called from the server as it is in the apparatus. For example, the setting information of a job using duplex printing function and prepared in an apparatus A having such duplex printing function cannot be used in an apparatus B that does not have the duplex printing function, and merely sharing the setting information in a server does not provide a usage environment that takes into consideration the differences between different apparatuses.

SUMMARY

An embodiment of the present invention may solve the above problem, and the purpose of an embodiment of the present invention may provide an information processing system and information processing apparatus, management apparatus, and information sharing method in which it is possible to share the setting information prepared on a certain apparatus among different apparatuses while reflecting the differences in capacity and functions.

In view of foregoing, an embodiment of this invention may solve at least one of the problems, and to provide new information processing system. The information processing system comprises a first information processing apparatus;

a second information processing apparatus; and a management apparatus to communicates the first and the second information processing apparatus, wherein the first information processing apparatus comprises a device information transmitting section which transmits a first device information of the first information processing apparatus to the management apparatus, and a setting information transmitting section which transmits a first setting information set in the first information processing apparatus to the management apparatus, wherein the management apparatus comprises a device information storing section which stores the first device information received from the first information processing apparatus, and a setting information storing section which stores the first setting information received from the first information processing apparatus associated with the first device information, wherein the second information processing apparatus comprises a device information transmitting section which transmits a second device information of the second information processing apparatus to the management apparatus, an inquiry section which executes an inquiry about the first setting information stored in the setting information storing section to the management apparatus, and a display section which displays a result of the inquiry, wherein the management apparatus further comprises a processing section which specifies a difference between the first device information and the second device information, when the management apparatus receives the inquiry from the second information processing apparatus, and processes the first setting information in accordance with the difference, and an information transmitting section which transmits a processed first setting information to the second information processing apparatus, wherein the display section of the second information processing apparatus displays the result of the inquiry based on the processed first setting information.

According to another aspect of the present invention, the information processing system comprises a plurality of information processing apparatuses; and a management apparatus to communicates the information processing apparatuses, wherein each information processing apparatus comprises a device information transmitting section which transmits a device information of the information processing apparatus to the management apparatus, a setting information transmitting section which transmits a setting information set in the information processing apparatus to the management apparatus, an inquiry section which executes an inquiry about the setting information stored in the setting information storing section to the management apparatus, and a display section which displays a result of the inquiry, wherein the management apparatus comprises a device information storing section which stores the device information received from the information processing apparatus, and a setting information storing section which stores the setting information received from the information processing apparatus associated with the device information, a processing section which specifies a difference between the device information stored in the device information storing section and the device information of the information processing apparatus where the inquiry is executed, when the management apparatus receives the inquiry from the information processing apparatus, and processes the setting information in accordance with the difference, and an information transmitting section which transmits a processed setting information to the information processing apparatus where the inquiry is executed, wherein the display section of the information processing apparatus where the inquiry is executed displays the result of the inquiry based on the processed setting information.

According to another aspect of the present invention, the information processing system comprises a plurality of information processing apparatuses; and a management apparatus to communicates the information processing apparatuses, wherein each information processing apparatus comprises a device information transmitting section which transmits a device information of the information processing apparatus and device ID to the management apparatus, a setting information transmitting section which transmits a setting information set in the information processing apparatus and device ID to the management apparatus, an inquiry section which executes an inquiry, including device ID, about the setting information stored in the setting information storing section to the management apparatus, and a display section which displays a result of the inquiry, wherein the management apparatus comprises a device information storing section which stores the device information and the device ID received from the device information transmitting section, and a setting information storing section which stores the setting information and the device ID received from the setting information transmitting section associated with the device information, a processing section which specifies a difference between the device information corresponding to the device ID stored in the device information storing section and the device information corresponding to the device ID included in the inquiry, when the management apparatus receives the inquiry from the information processing apparatus, and processes the setting information in accordance with the difference, and an information transmitting section which transmits a processed setting information to the information processing apparatus where the inquiry is executed, wherein the display section of the information processing apparatus where the inquiry is executed displays the result of the inquiry based on the processed setting information.

The invention itself, together with further features and attendant advantages, will best be understood by reference to the following detailed description taken in conjunction with the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

In the following description, like parts are designated by like reference numbers throughout the several drawings.

DETAILED DESCRIPTION OF THE PREFERRED EMBODIMENT

Some preferred embodiments of the present invention are described below based on drawings.

Figure 1:
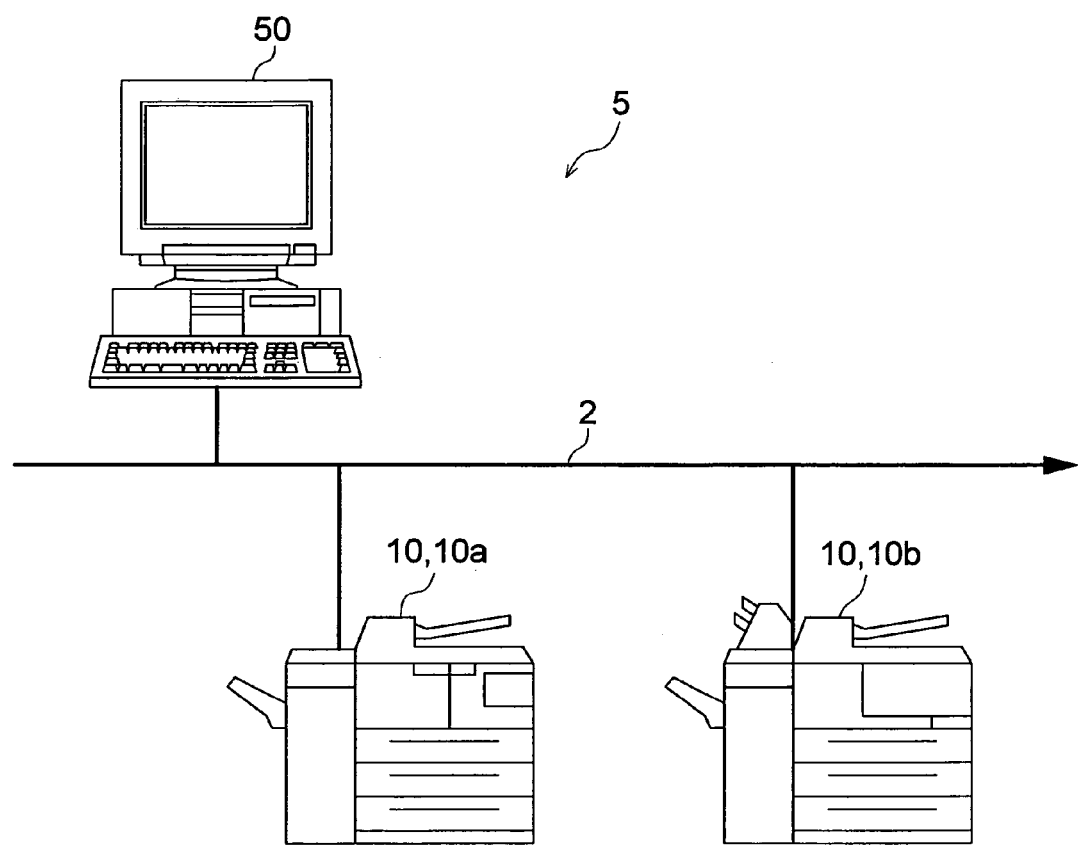
FIG. 1 is an explanatory diagram showing the system configuration of an information processing system according to a preferred embodiment of the present invention.

FIG. 1 is an explanatory diagram showing the system configuration of an information processing system 5 according to a preferred embodiment of the present invention. The information processing system 5 is configured to comprise a plurality of information processing apparatuses 10 and a management apparatus 50. The information processing system 5 and the various information processing apparatuses 10 are connected so that they can communicate via a network 2 such as a LAN (Local Area Network). Here, the example is taken of the first and the second information processing apparatuses 10a and 10b being connected as the information processing apparatuses (hereinafter, an information processing apparatus is referred to merely as the apparatus). Further, in the present preferred embodiment, an example is described in which the information processing apparatus 10 is taken as a digital multi-function peripheral having the copier function of copying documents, the printer function of printing according to the print data, and the facsimile function, etc., and the management apparatus 50 is constituted by a server on the network.

There are some slight differences in the functions and capacities of the first information processing apparatus 10a and the second information processing apparatus 10b. For example, the difference is in the functions of a finisher apparatus such as punching holes in the output sheets or binding by stapling, or in the presence or absence of the duplex printing function, etc.

Figure 2:
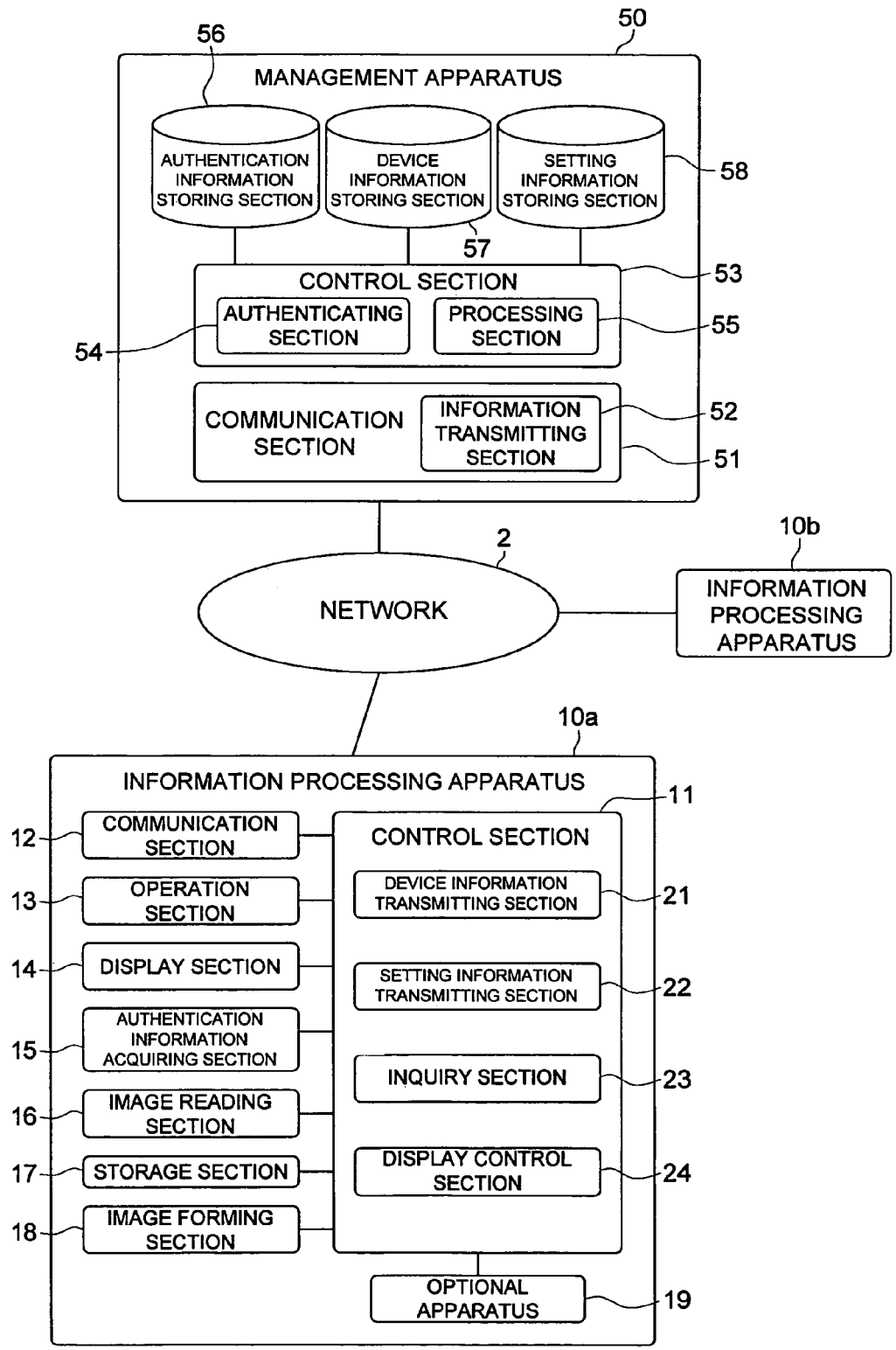
FIG. 2 is a block diagram showing the configurations of the information processing apparatus and the management apparatus that are included in the configuration of an information processing system according to a preferred embodiment of the present invention.

FIG. 2 shows the functional configurations of the information processing apparatuses 10a and 10b, and of the management apparatus 50 that are included in the configuration of an information processing system 5 according to a preferred embodiment of the present invention. Since the first information processing apparatus 10a and the second information processing apparatus 10b have almost identical configurations excepting the above slight differences, the first information processing apparatus 10a is described here as the representative apparatus and the description of the second information processing apparatus 10b is omitted here. The first information processing apparatus 10a is provided with a control section 11, a communication section 12, an operation section 13, a display section 14, an authentication information acquiring section 15, an image reading section 16, a storage section 17, an image forming section 18, and an optional apparatus 19.

The control section 11 carries out the function of comprehensively controlling all the operations of the information processing apparatus 10a, and is configured to comprise as its major sections of a CPU, a ROM, a RAM, etc. The communication section 12 carries out the function of transmitting and receiving various types of information with the management apparatus 50 or with other external terminals via the network 2. The operation section 13 carries out the function of receiving from the user various types of setting operations or instruction operations, and is configured using a touch panel, etc. The display section 14 carries out the function of displaying to the user the operating state and set state of the apparatus, and various types of guidance information, etc., and is configured using an LCD display, etc.

The authentication information acquiring section 15 carries out the function of acquiring the information related to user authentication. For example, this is configured using a reading device for ID cards with authentication information, or a device reading in biometric information related to biometric authentication such as vein authentication. When authenticating the user based on a password input from the communication section 12, the operation section 13 functions as the authentication information acquiring section 15. Apart from this, it is also possible to acquire the information related to user authentication from a mobile telephone or an RFID tag with authentication information. The user authentication information need not be any one of a password input from the operation panel in the main unit of the information processing apparatus, an authentication information obtained from an ID card inserted in the main unit of said information processing apparatus, and a biometric information acquired by said information processing apparatus, but can also be a combination of two or more of these.

The image reading section 16 carries out the function of reading images of the original document. The storage section 17 carries out the function of, apart from storing the data of the images read out by the image reading section 16, storing various types of setting information set by the users and storing the default values for the apparatus related to the different setting items. The image reading section 16 is constructed using a non-volatile memory or a hard disk drive (HDD), etc.

The image forming section 18 carries out the function of forming images on sheets and outputting them. Here, this section is constituted by a print engine of using the electrophotographic method. The optional apparatus 19 is constituted by a sheet finishing apparatus that carries out the functions of punching holes in the sheets output by the image forming section 18, folding the sheets in two or three, binding the sheets by stapling, etc. Apart from this, the optional apparatus 19 can be a stacker, or a large capacity sheet feeder apparatus, or can be a cover page inserting apparatus that is used when preparing booklets.

The control section 11 is provided with the functions of a device information transmission section 21, a setting information transmission section 22, an inquiring section 23, and a display control section 24. The device information transmission section 21 carries out the function of transmitting the device information of that information processing apparatus 10a to the management apparatus 50.

The device information is the attributes information unique to the apparatus, and includes the conditions such as the presence or absence of various functions and capacities and their types. For example, this includes the network information such as the IP (Internet Protocol) address or the MAC (Media Access Control) address of the apparatus, firmware information of the apparatus such as the ROM version number, optional functions information such as duplex printing function or sheeting finisher, etc., and all the setting information such as the default values registered for each apparatus.

The device information transmission section 21 establishes correspondence between the device information and the device ID of that information processing apparatus 10a and sends them to the management apparatus 50, and the management apparatus 50 stores these device information and device ID after establishing the correspondence between them. The device ID is identification information using which it is possible to uniquely identify that apparatus and a unique device number is used for this. Other than this, the device ID can also be a unique address allocated to it on the network (such as the MAC address), etc.

The setting information transmission section 22 carries out the function of transmitting to the management apparatus 50 the setting information prepared by the user in that information processing apparatus 10a. The setting information is information indicating the set values of various setting items that can be set by the user. Here, the explanation will be continued taking that a job record which is a collection of set values that specify the operating conditions at the time of executing the job is the setting information. A job record comprises the type of job (facsimile transmission, copying, printing, etc.), presence or absence of duplex printing mode, presence or absence of and details of sheet finishing operations such as punching, folding, stitching, etc.

Job records are maintained for each user, and each user can register up to a prescribed maximum number of job records of that user. It is possible to assign any name to each job record so that it is possible to find out the required job record from among a large number of job records. Once a job record is registered, by calling a job record that has been registered, it is possible to set and reproduce automatically the contents of settings indicated by that job record.

The setting information transmission section 22 transmits to the management apparatus 50 a job record, the user ID of the user who has prepared that job record, and the device ID of that information processing apparatus 10a (the device ID of the apparatus in which that job record was prepared) after establishing the correspondence among them. The management apparatus 50 stores the job records separately for each user ID after establishing correspondence between job records and the device ID of the apparatus in which the job record was prepared. Further, in addition to being transmitted to the management apparatus 50, the job records are also stored in the storage section 17 of the corresponding information processing apparatus 10a.

The inquiring section 23 carries out the function of making an inquiry to the management apparatus 50 in order to call a job record (setting information) that is stored in the management apparatus 50. Here, by sending to the management apparatus 50 an inquiry including the device ID and the user ID of the inquiring information processing apparatus 10a, it is possible to call the job record corresponding to that user ID. Further, hereinafter, the inquiring information processing apparatus is also referred to as the inquiring apparatus or the using apparatus.

The display control section 24 carries out the function of making a display in the display section 14 based on the job record obtained from the management apparatus 50 in response to an inquiry sent by the inquiring section 23.

The management apparatus 50 is provided with a communication section 51, a control section 53, an authentication information storing section 56, a device information storing section 57, and a setting information storing section 58. The communication section 51 includes the function of an information transmitting section 52, and the control section 53 includes the functions of an authenticating section 54 and a modifying means 55.

The communication section 51 carries out the function of communicating with each of the information processing apparatuses 10a and 10b via the network 2. The control section 53 has the function of comprehensively controlling the operations of that management apparatus 50. The authenticating section 54 of the control section 53 carries out the functions of apparatus authentication, which is the function of verifying the access rights of that apparatus itself for accesses from the information processing apparatus 10a and 10b, and user authentication, which is the function of verifying the access rights of the user. The authentication information storing section 56 is a database storing the authentication information that is referred to at the time the authenticating section 54 carries out apparatus authentication or user authentication.

The device information storing section 57 is a database that stores the device information received from the device information transmission section 21 of each of the information processing apparatuses 10a and 10b while establishing its correspondence with the device ID received along with it.

The setting information storing section 58 is a database that stores the job records (setting information) received from the setting information transmission section 22 of each of the information processing apparatuses 10a and 10b while establishing its correspondence with the user ID and the device ID received along with it. In other words, the job records are stored in the device information storing section 57 while establishing their correspondence with the user ID of the person preparing it and with the device ID of the apparatus in which it was prepared. The device information stored in the device information storing section 57 and the job setting information stored in the setting information storing section 58 are corresponded with each other using the device ID as the key.

The processing section 55 of the control section 53 carries out the functions of extracting the job record of that user from the setting information storing section 58 in accordance with the inquiries from each of the information processing apparatuses 10a and 10b, comparing the device information of the apparatus preparing that job record with the device information of the inquiring apparatus and identifying the points of difference between them, and also of modifying the job record based on those points of difference. The information transmitting section 52 of the communication section 51 carries out the function of transmitting to the inquiring information processing apparatus 10a or 10b the response to the inquiry, that is, the job record in which the necessary processing have been made.

Figure 3:
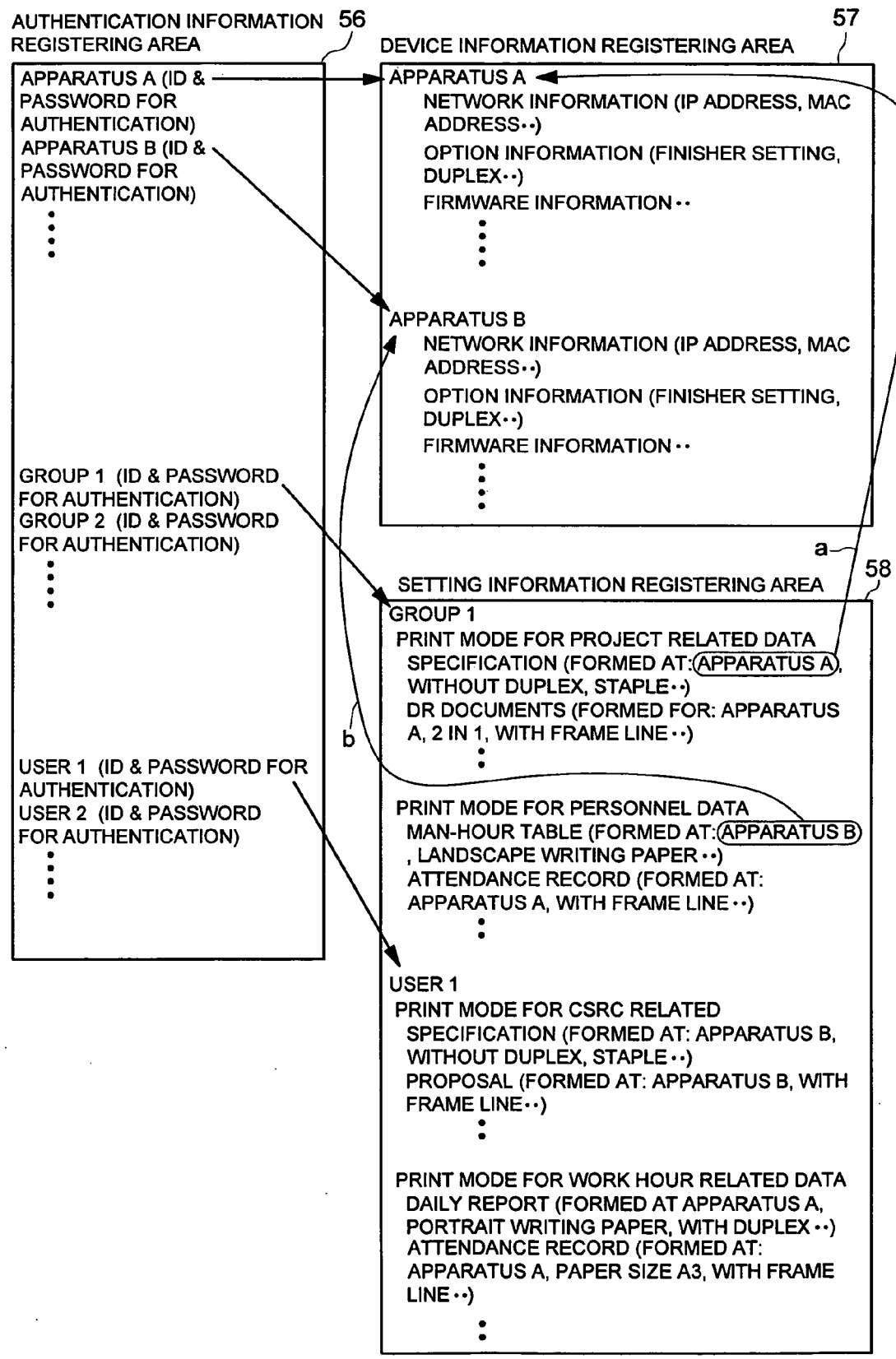
FIG. 3 is an explanatory diagram showing an example of the contents registered in the authentication information storing section, device information storing section, and setting information storing section, and the status of establishing correspondence among different data items.

FIG. 3 shows an example of the contents registered in the authentication information storing section 56, the device information storing section 57, and the setting information storing section 58, and also shows the state of correspondence between the data. In the authentication information storing section 56 (the authentication information registration area) registered is, for each information processing apparatus that can be accessed in the information processing system 5, that device ID and the authentication information for apparatus authentication (ID for authentication and password) with the correspondence established between them. The entries "Apparatus A", "Apparatus B", etc., correspond to the device ID. Also, in the authentication information storing section 56 registered is, for each user (group or individual) able to access the information processing system 5, the user ID of that user and authentication information for user authentication (ID for authentication and password) with the correspondence established between them. The entries "Group 1", "Group 2", "User 1", and "User 2" in the figure correspond to the user ID.

The device information is stored in the device information storing section 57 while establishing its correspondence with the device ID. The device information can include network information, option information, and firmware information, etc.

The setting information storing section 58 has registered in it job records classified according to the user ID such as "Group 1", "User 1", etc. The job records are further classified within each user ID and each job record is assigned a unique name. For example, job records of "User 1" are classified into "CSRC related printing mode", or "printing mode of attendance related data", etc. Further, each job record is registered with a name such as "Specifications", "Proposal", "Daily report", "Attendance register", etc.

Various types of setting information are registered in each job record, such as, the presence or absence of duplex print mode or "2-in-1" setting, presence or absence of stapling operation, etc. The correspondence of each job record is established with the device ID of the apparatus in which that job record was prepared. Here, the correspondence between the job record and the device ID is being established by including the device ID of the apparatus in which the job record was prepared in a part of the job record. The correspondence of each job record is established with the device information in the device information storing section 57 using the device ID as the key, as is shown by the arrow 'a' and arrow 'b' in the figure. Further, "2-in-1" refers to the function of reducing two sheets of the document and laying out in one sheet of the print out.

Next, the operation of the information processing system 5 is described below.

Figure 4:
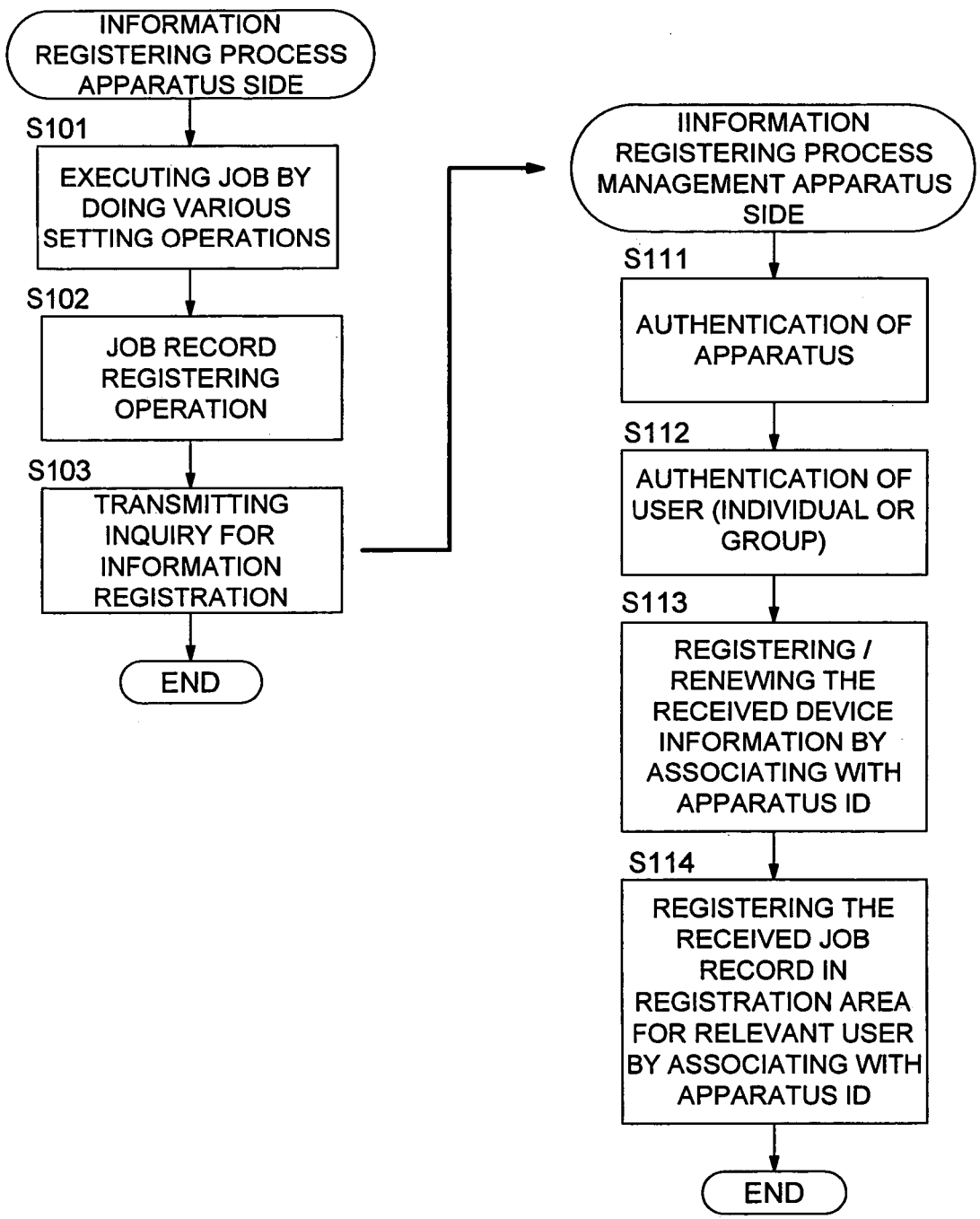
FIG. 4 is a flow chart showing the information registration processing in an information processing system according to a preferred embodiment of the present invention.

FIG. 4 is a flow chart showing the information registration operation in which the management apparatus 50 stores the device information and job record received from the information process apparatus 10. Here, at the time of transmitting the job record prepared by the user to the management apparatus 50 and registering it, the device information at that time is transmitted simultaneously thereby updating the device information stored in the management apparatus 50 to the latest value.

To begin with, the user enters the job by carrying out various setting operations and executes that job (Step S101). At this time, the user can register the contents of the settings for that job as own job record, and when this registration operation is carried out (Step S102), an information registration request is transmitted to the management apparatus 50 (Step S103).

The information registration request includes the device ID of that information processing apparatus 10, the ID and password for apparatus authentication, user ID and password of that user, contents of the job record being registered at that time, and the device information of that apparatus.

The management apparatus 50, upon receiving the information registration request from the information processing apparatus 10, the ID and password for apparatus authentication included in the received information registration request are collated with the authentication information for apparatus authentication stored in the authentication information storing section 56 thereby authenticating the excess rights of the apparatus transmitting that information registration request (Step S111). In addition, the user ID and password included in the information registration request received from the information processing apparatus 10 is collated with the authentication information for user authentication stored in the authentication information storing section 56 thereby authenticating the access rights of the user corresponding to that user ID (Step S112).

When these authentications are successful, not only the device information and the device ID included in the current information registration request are registered after establishing their correspondence in the device information storing section 57 (Step S113), but also the user ID, job record, and device ID included in that information registration request are registered after establishing their correspondence in the setting information storing section 58 (Step S114), after which the operation is terminated (End). Further, if the authentication is not successful in any one of apparatus authentication and user authentication, the information registration request will be denied.

By carrying out the above type of information registration operation in each of the information processing apparatuses 10a and 10b, the device information of each apparatus and the job records of each user in the information processing system 5 are registered in the management apparatus 50.

Further, it is not necessary to carry out the registration of device information in the management apparatus 50 along with that of job records, but can be done at any appropriate timing. For example, this can be done at the time the power is switched on to the information processing apparatus 10, or when some change occurs in the device information such as addition or deletion of option apparatus, change of default values, etc. Further, it is possible to prepare job records without having any relationship to job execution. Also, it is also possible to carry out only local registration in the storage section of the same unit at the time of preparing a job record, and to register it in the management apparatus 50 separately by transmitting it. For example, it is possible to have a configuration in which, among the job records that have already been registered, the user can select only those that need to be shared in the information processing system 5 and send them to the management apparatus 50.

Figure 5:
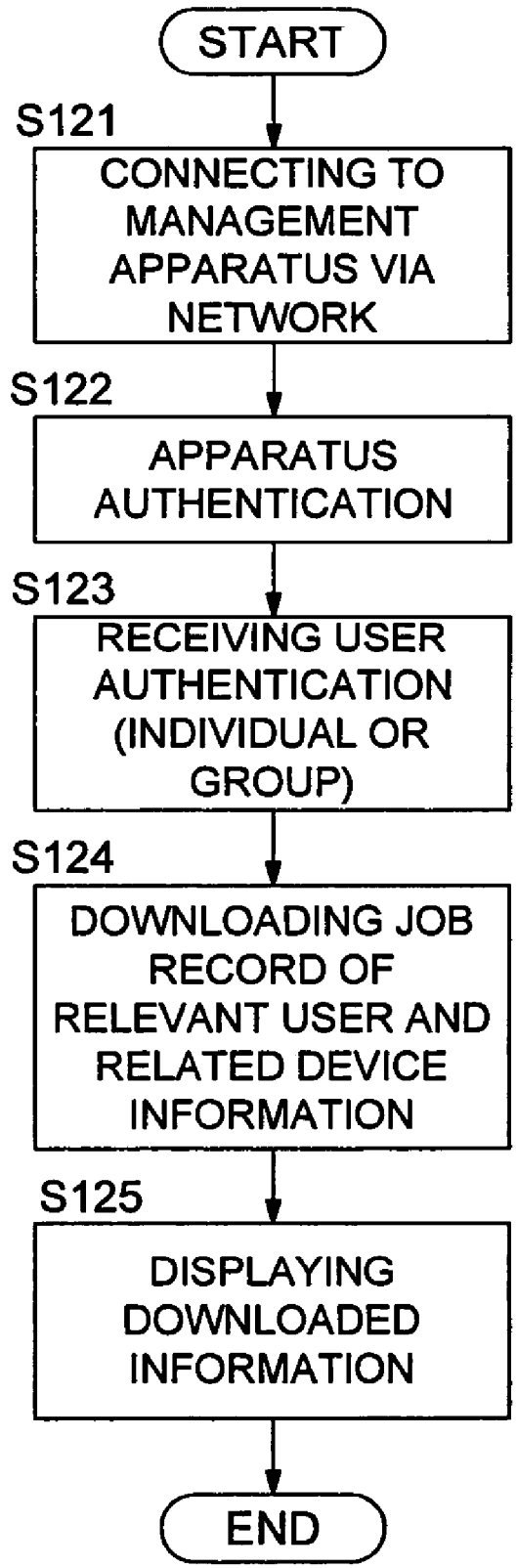
FIG. 5 is a flow chart showing the operations of the information processing apparatus at the time of inquiring a job record.

FIG. 5 shows the operations in the information processing apparatus 10 related to inquiry about a job record. The information processing apparatus 10 is connected to the management apparatus 50 via the network 2 (Step S121), the apparatus authentication is obtained (Step S122), and the user authentication is obtained by transmitting to the management apparatus 50 the user authentication information obtained at the time the user logged in (Step S123). In other words, using the logging in of the user as an opportunity, an inquiry related to job records is made to the management apparatus 50. In association with this inquiry, the user IDs of all users who have logged in and the device ID are posted to the management apparatus 50.

In answer to this inquiry, the information processing apparatus 10 downloads from the management apparatus 50 the job record or other related information (Step S124), and displays that information in the display section 14 (Step S125).

Figure 6:
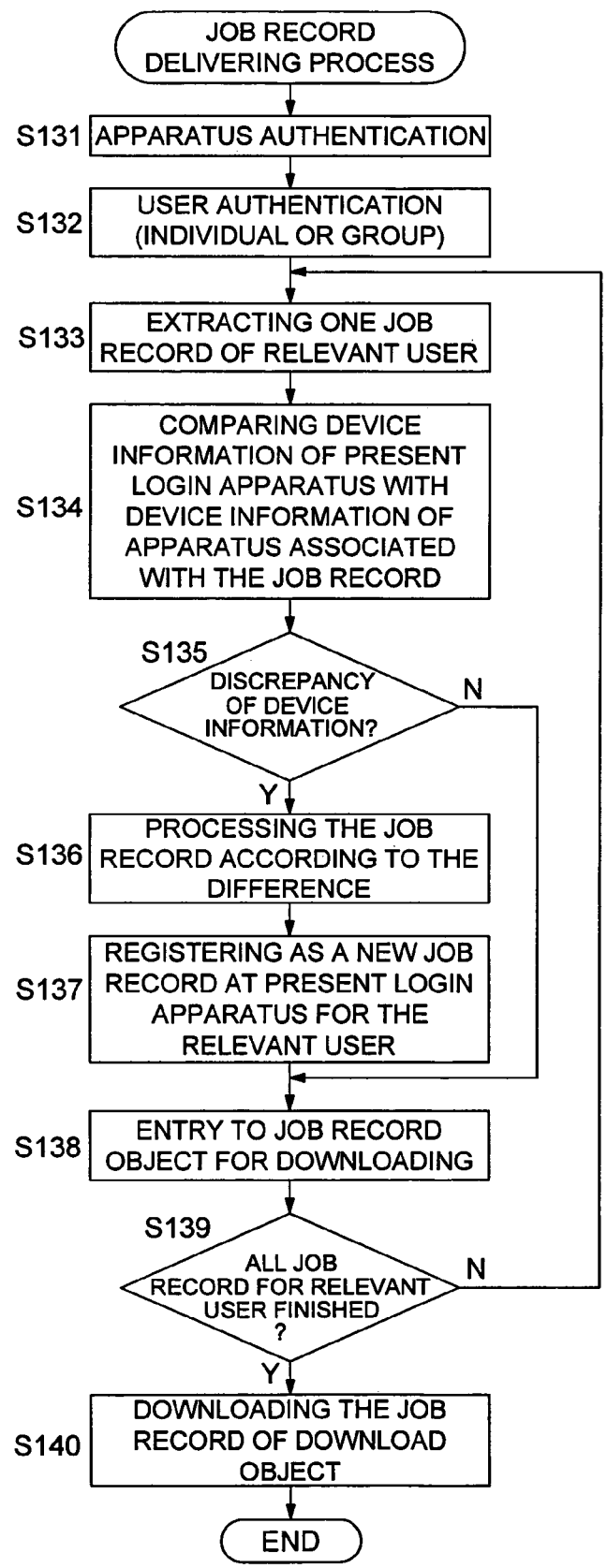
FIG. 6 is a flow chart showing the operations of the management apparatus that has received an inquiry about a job record.

FIG. 6 shows the operation of the management apparatus 50 that has received an inquiry related to a job record. The management apparatus 50, at the time of receiving the above inquiry, carries out apparatus authentication of verifying the access rights of the inquiring apparatus (Step S131), and in addition, verifies by user authentication the access rights of the user related to the inquiry (Step S132).

If the above authentications succeed, the job records registered in the setting information storing section 58 corresponding to the authenticated user ID is permitted to be accessed, and, for example, one of them is accessed in the order in which they are registered (Step S133). Next, the device information of the apparatus corresponding to the device ID having correspondence with the extracted job record, and the device information of the currently logged in apparatus, that is, corresponding to the device ID of the inquiring apparatus, are obtained from the device information storing section 57, and the points of difference between these two are identified (Step S134). The points of difference here do no include network information such as the IP address or the MAC address, but are the points of difference related to the functions or capacity that have influence during the execution of that job record. For example, these points of difference are the functions of the sheet finisher or the duplex printing function, etc.

If there are no differences in using the concerned job record between the apparatus preparing the job record and the apparatus using it (Step S135: N), the job record read out from the setting information storing section 58 is as it is made the entry to be downloaded (Step S138). On the other hand, if there is any difference between the two (Step S135: Y), that job record is modified for it to be used in the inquiring apparatus (Step S136), and the job record after modification is stored additionally in the setting information storing section 58 as a new job record prepared by the inquiring apparatus (Step S137). Next, the modified job record that was stored additionally is made the entry to be downloaded (Step S138).

The operations of Steps S133 to S138 above are repeated for all the job records which have been associated with the authenticated user ID (Step S139: N), and when the above processing is completed for all the job records of that user (Step S139: Y), all the job records that have been entered as targets to be downloaded are transmitted to the inquiring apparatus (Step S140) and the processing is terminated (End).

In the above operations, the following are the processing made in the job record when there is some point of difference in the device information.

(1) When a function that is specified in the job record is not present in the inquiring apparatus, that function is turned off.

(2) When a function that is specified in the job record is not present in the inquiring apparatus, that function is changed to an alternative function that can be used in the inquiring apparatus.

For example, as an example of (1) above, if the preparing user wishes to use the job record "Proposal" of apparatus B in apparatus A, let us consider that the functions of "Duplex printing" and "2-in-1" are set in that job record "Proposal", and among these functions the function "Duplex printing" is not available in apparatus A. In this case, the job record is prepared so that the setting of "Duplex printing" that cannot be used in apparatus A is turned off and only the function "2-in-1" is turned on. Therefore, a job record "Proposal" is prepared newly with apparatus A as the preparing apparatus (preparing apparatus A, 2-in-1) and is stored additionally in the setting information storing section 58.

Further, as an example of (2) above, when the "Stapling" function has been specified in the job record, and when this "Stapling" function is not present in the inquiring apparatus A but the "Punching" function is present, the job record is modified so as to change the function "Stapling" to "Punching".

Apart from this, it is good to make the processing so that the difference is small between the result of executing the job based on that job record in the information processing apparatus in which the job record was prepared and the result when executed in the inquiring information processing apparatus.

In addition, even adding to the job record information for identifying the presence or absence of processing and/or the contents of processing is also a part of job record modification. For example, when the "Duplex printing" function is switched off, an item of information is added to the job record making it possible to identify that the "Duplex printing" function has been switched off.

Next, explanation is given about the case in which, even when a function specified in the job record is present in the inquiring apparatus, the contents of operations in the two apparatuses are different due to differences in their device information.

Figure 7:
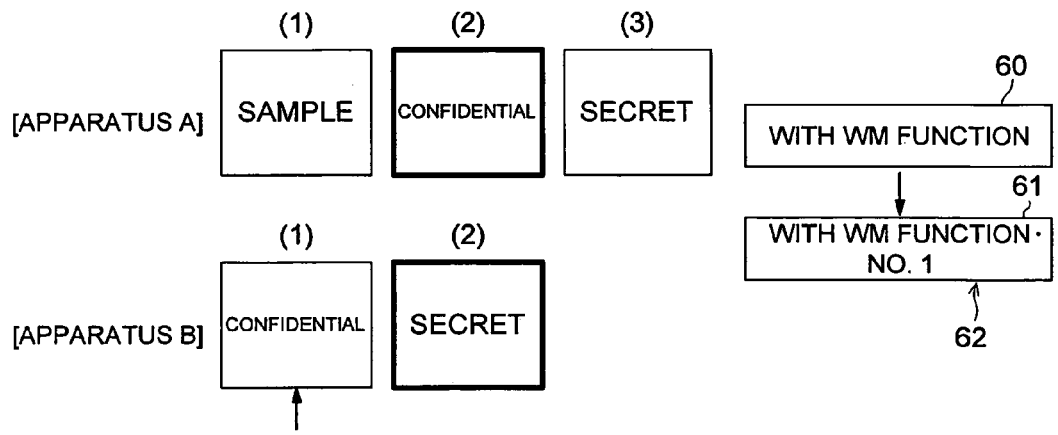
FIG. 7 is an explanatory diagram showing an example of the details of job record modification based on the differences in the watermark.
Figure 7:
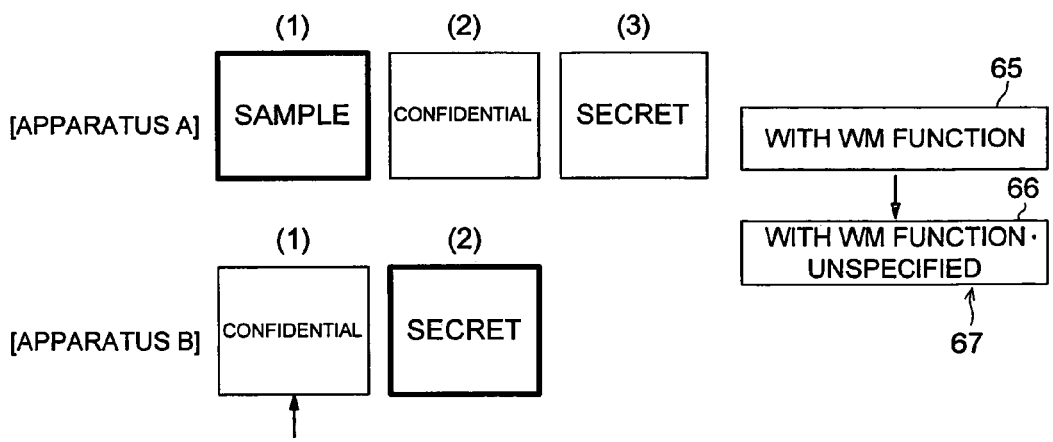

FIG. 7(*a*), 7(*b*) show the case when the function of adding watermarks (the WM function) is present in both apparatus A and apparatus B, there is difference in the usable types of watermarks or in the types of watermarks set as default values of the apparatuses.

In FIG. 7(*a*), apparatus A is provided with watermarks No. 1 to No. 3, in which the characters of the first watermark are "Sample", of the second are "Confidential", and of the third are "Secret". In addition, the second watermark "Confidential" has been set as the default value in apparatus A (indicated by bold in the figure). On the other hand, in apparatus B, only the first and the second watermarks are present which are "Confidential" and "Secret", and the second watermark "Secret" has been set as the default value of the apparatus B.

By specifying merely "Watermark: On" in the job record, it would only mean that the default watermark will be used, and if that job record is executed in apparatus A, the "Confidential" watermark will be put but the "Secret" watermark will be placed if the same job record is executed in apparatus B. Even in such cases, if the device information contains information recorded in it as to what watermarks are present in it and which watermark is the default watermark, the difference between apparatus A and apparatus B becomes clear when their device information are compared, and it becomes possible to add appropriate processing.

In this example, since the same watermark as the second watermark "Confidential" used as the default in apparatus A is present as the first watermark in apparatus B, corresponding to the original job record 60, the setting information 62 has been added indicating the use of the first watermark in the modified job record 61. Because of this, if the job record after modification is executed in apparatus B, the "Confidential" watermark will be used and hence it is possible to obtain the same result as in apparatus A which is the apparatus in which the job record was prepared.

In FIG. 7(*b*), although the types of watermarks possessed by apparatus A and apparatus B are the same as in FIG. 7(*a*), the watermark set as default is the first one "Sample" in apparatus A and the second one "Secret" in apparatus B. In this case, there is no watermark in apparatus B with the same content as the first watermark "Sample" in apparatus A which is also its default watermark. Hence, in this case, the setting information 67 has been added indicating that the watermark to be used is not defined in the job record after modification 67 as compared to the job record 65 before modifying. By adding the information "Undefined", it is possible to avoid the default watermark of apparatus B being used, and the user can take some measure in apparatus B.

Further, when the specification "Undefined" is used, it is good to download the job record in apparatus B with the information added indicating that the watermark "Sample" was being used in apparatus A which is the apparatus in which the job record was prepared. Because of this, information is given that the watermark "Sample" was being used in the apparatus A in which the job record was prepared, and it is possible to make the user of apparatus B select the countermeasures. Further, if there is any other watermark such as "Example" that resembles "Sample", the job record can be modified to use that watermark as an alternative. In this case, it is good to register beforehand the relationships of similarities.

In this manner, when there is no difference between the apparatuses in the presence or absence of the functions specified in the job record, but there is some difference in the conditions at the time of realizing those functions, since the fact that some difference will be present in the result of job record execution only becomes clear when the device information of the preparing apparatus and the device information of the inquiring apparatus are compared, the function of comparing the device information and identifying the differences between the apparatuses becomes particularly effective.

Figure 8:
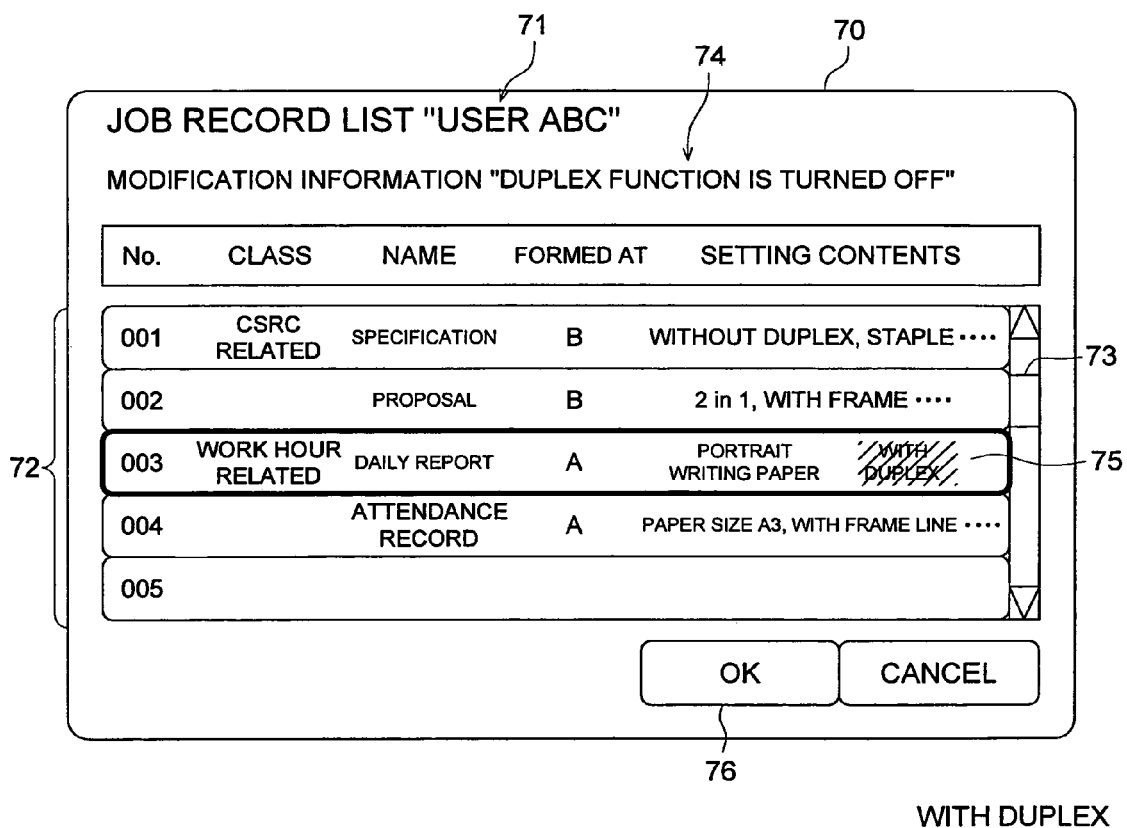
FIG. 8 is an explanatory diagram showing an example of a job records list screen displayed in the display section of the information processing apparatus.

FIG. 8 is an example of the job records list screen 70 which displays the downloaded job records. The "User display column" 71 in the top part of the job records list screen 70 displays the user name of the person preparing the job record. The plurality of downloaded job records are displayed in the form of a list in the list display area 72 at the center of the job records list screen 70. One job record is displayed in one line of the list, and the items listed in each line are, from left to right, "No.", "Class", "Name", "Formed by", and "Setting Contents".

The user can change the displayed range of job records by operating the scroll bar 73 at the right of the screen. In addition, the screen is a touch panel, and it is possible to select a job record by touching any required line displayed in the list display area 72. In FIG. 8, the job record of No. 003 has been selected. The detailed contents of processing related to the selected job record are displayed in the "Modification information column" 74 below the "User display column" 71.

The list in this example is the one that is displayed in apparatus B in which it is not possible to use the duplex printing function, and the display 75 of the item "with Duplex" is grayed-out in the job record No. 003 which was prepared in apparatus A. Because of grayed out display the user can identify that, that function which was being used in the preparing apparatus A cannot be used in apparatus B, that is, a modification of turning off the function has been made. Further, this fact is indicated by the message "Duplex function is turned off" in the "Modification information column" 74.

When the "OK" button 76 is operated with some job record in the selected state, the contents of that job record will be set in that apparatus, and it is possible to execute the job with those settings. Apart from this, it is also possible not to display the part corresponding to a function that cannot be used, or to display it by adding a special mark such as an asterisk, or to give a voice guidance message such as "Duplex mode printing cannot be used", thereby indicating or reporting that the function cannot be used.

In the above manner, each user can use a job record (setting information) prepared by that user in any information processing apparatus 10 in any other information processing apparatus within the system. At the time of using a job record (setting information), the differences in functions and capacities between the apparatus in which the job record was prepared and the using apparatus (inquiring apparatus) are identified, based on these identified differences the job record (setting information) is modified so that it can be used in the inquiring apparatus. The identification of differences is done by comparing the device information (stored in the management apparatus) related to the apparatus in which the job record is prepared with the device information of the inquiring apparatus. Further, when modified, it is also possible to recognize the presence or absence of modification and the contents of modification, and it is possible to use the maximum extent the job record after modification while recognizing the differences between the device information (stored in the management apparatus) related to the apparatus in which the job record is prepared and the device information of the inquiring apparatus.

Further, since the device information and the device ID have been stored separately with the correspondence between them established, it is possible to reduce the storage capacity used in the management apparatus 50 compared to the case when the device information of the apparatus in which the job record was prepared is embedded within each job record.

In the above, although a preferred embodiment of the present invention has been described with reference to the drawings, the concrete configuration need not be construed to be limited to that shown in the preferred embodiment, but any processing or additions made without deviating from the scope and intent of the present invention shall also be included in the present invention.

For example, in the preferred embodiment above, although the explanation was given taking job records as examples of setting information, it is possible to have other types of setting information. For example, it can also be an address book in which the settings related to the displayed items and display format of the operation panel and the facsimile transmission destinations are registered. In the address book, in the case when the internet facsimile function and public switched telephone line facsimile function could be used in apparatus A but the internet facsimile function cannot be used in apparatus B, the processing can be made such as graying-out or erasing the address parts related to internet facsimile function.

Further, although in the preferred embodiment above the job records were being managed for each user, it is possible to have a configuration in which job records that can be used by any body are registered in the management apparatus so that they can be shared. In this case, there is no need for user ID or user authentication at the time of registration or inquiry of job records.

Although in the preferred embodiment above the correspondence between job records and device information was established using device ID, it is also possible to establish the correspondence between job records and device information by adding to each job record a pointer indicating the storage area of the corresponding device information. Although in the preferred embodiment above an example was described of extracting the usable job records (setting information) from among the job records (setting information) stored in the setting information storing section based on the user ID transmitted from the inquiring information processing apparatus, the present invention shall not be restricted to this. For example, it is possible to extract the usable job records (setting information) based on the device ID that is input in and transmitted from the inquiring information processing apparatus. Also, it is possible to make usable all the job records (setting information) stored in the setting information storing section. Further, in comparing the device information, it is possible to compare all the device information stored in the device information storing section with the device information of the inquiring information processing apparatus, or the comparison can be made with the device information that have been stored while establishing correspondence with the device ID transmitted from that inquiring information processing apparatus, or else the comparison can be made with the device information that have been stored while establishing correspondence with the user ID transmitted from the inquiring information processing apparatus.

Although in the preferred embodiment above an independent management apparatus 50 was provided, it is possible to have a configuration in which any one of the information processing apparatuses 10 includes the functions of the management apparatus 50. Further, the information processing apparatus 10 need not be limited to a digital multi-function peripheral, but can be any apparatus that requires various types of settings, and can be a copying machine, a facsimile machine, a printer, or a computer apparatus.

According to the preferred embodiment of the present invention, the device information of a first information processing apparatus and a second information processing apparatus are respectively stored in a management apparatus, or, the second device information is obtained at the time of an inquiry and also the setting information prepared in the first information processing apparatus is stored in the management apparatus while establishing correspondence with the device information of the first information processing apparatus. When an inquiry about setting information is made to the from the second information processing apparatus, the management apparatus identifies the points of difference between the device information of the first information processing apparatus and the device information of the second information processing apparatus regarding the different setting information items prepared in the first information processing apparatus at the time of using that setting information, and transmits the setting information modified based on these points of difference to the second information processing apparatus. The second information processing apparatus carries out display based on the setting information received from the management apparatus.

In other words, the setting information prepared in the first information processing apparatus can be used in a second information processing apparatus after reflecting in it the differences in capacity and functions between the first information processing apparatus and the second information processing apparatus.

The device information is the attributes information unique to the apparatus, and includes conditions such as the presence or absence of various types of capacities and functions and their types. For example, this corresponds to the capacity, functions, presence or absence of optional apparatus, firmware version number, the default values of various setting parameters for the apparatus, etc.

The setting information is information that indicates the set values for various setting parameters that can be set by the user, and corresponds to, for example, a "job record" that is a collection of set values with a name assigned to it and specifies the operating conditions at the time of executing a certain job. Taking the example of a digital copying machine, a job record is a collection of set values indicating the type of job (facsimile transmission or document copying, printing, etc.,) presence or absence of duplex printing, presence or absence and details of finisher operations such as punching, folding, stapling, etc.

The processing related to the setting information does not modify directly the values stored in the setting information storing section, but the original values are left as such and the values read out from the setting information storing section are modified.

In the present structure, for example, in the case when the device information of the first information processing apparatus indicates that the duplex printing function is valid and the device information of the second information processing apparatus indicates that the duplex printing function is not valid, if the setting information prepared in the first information processing apparatus is using the duplex printing function, the setting information is modified so as not to use the duplex printing function, or the setting information is modified so as to add to it the information that although duplex printing function has been set that function cannot be used. Because of this, the second information processing apparatus can either erase or gray-out the duplex printing function in the display screen of the setting information called from the management apparatus.

The above-described embodiment is achieved further by the following embodiments.

According to the another embodiment, the device information of a first information processing apparatus and a second information processing apparatus are respectively stored in a management apparatus, or, the second device information is obtained at the time of an inquiry and also the setting information prepared in the first information processing apparatus and the corresponding user ID are stored in the management apparatus while establishing correspondence with the device information of the first information processing apparatus. In other words, the setting information is managed for each user ID. When an inquiry including the user ID is made to the management apparatus from the second information processing apparatus, the management apparatus identifies, for each setting information corresponding to that user ID and at the time of using that setting information, the points of difference between the device information of the first information processing apparatus and the device information of the second information processing apparatus, and transmits the setting information modified based on these points of difference to the second information processing apparatus. The second information processing apparatus carries out display based on the setting information received from the management apparatus. In this manner, each user can use in a second information processing apparatus the setting information that the user has prepared in a first information processing apparatus after reflecting in it the differences in the capacities or functions between the first information processing apparatus and the second information processing apparatus.

According to the another embodiment, the device information of each of the information processing apparatuses belonging to the system is stored in the management apparatus, and also, all the setting information prepared in each information processing apparatus are stored in the management apparatus while establishing correspondence with the device information of the information processing apparatus in which that setting information was prepared. When an inquiry regarding a setting information is sent to the management apparatus from any information processing apparatus, the management apparatus identifies, for each setting information read out from the device information storing section, the points of difference between the device information of the information processing apparatus in which that setting information was prepared and the device information of the inquiring information processing apparatus (which is the information processing apparatus where inquiry is executed) at the time of using that setting information, and transmits the setting information modified based on these points of difference to the inquiring information processing apparatus. The inquiring information processing apparatus carries out display based on the setting information received from the management apparatus. In other words, the setting information prepared in any information processing apparatus is shared by the different information processing apparatuses within the system so that it can be used after reflecting in it the differences in capacity and functions between the information processing apparatus preparing the setting information and the inquiring (using) information processing apparatus.

According to the another embodiment, the device information of each of the information processing apparatuses belonging to the system is stored in the management apparatus, and also, all the setting information prepared in each information processing apparatus along with the user ID of the user preparing that setting information are stored in the management apparatus while establishing correspondence with the device information of the information processing apparatus in which that setting information was prepared. When an inquiry including a user ID is sent to the management apparatus from any information processing apparatus, the management apparatus extracts the setting information corresponding to that user ID from among all the stored setting information, and for each of the setting information so extracted, identifies the points of difference between the device information of the information processing apparatus in which that setting information was prepared and the device information of the inquiring information processing apparatus at the time of using that setting information, and transmits the setting information modified based on these points of difference to the inquiring information processing apparatus. The inquiring information processing apparatus carries out display based on the setting information received from the management apparatus. In other words, the setting information prepared in any information processing apparatus can be used by each user in different information processing apparatuses within the system after reflecting in it the differences in capacity and functions between the information processing apparatus preparing the setting information and the inquiring (using) information processing apparatus.

According to the another embodiment, the device information of each of the information processing apparatuses belonging to the system is stored in the management apparatus while establishing correspondence with the device ID which is the identification information that can uniquely identify that apparatus, and also, all the setting information prepared in each information processing apparatus are stored in the management apparatus while establishing correspondence with the device ID of the information processing apparatus in which that setting information was prepared. Because of this, the correspondence of each of the setting information is established with the device information of the information processing apparatus in which it was prepared using the device ID as the key.

When an inquiry including a device ID is sent to the management apparatus from any information processing apparatus, for each of the setting information read out from the device information storing section, the management apparatus identifies the points of difference, at the time of using the setting information, between the device information corresponding to the device ID associated with that setting information (the device information of the information processing apparatus in which that setting information was prepared) and the device information corresponding to the device ID included in the inquiry (the device information of the apparatus generating the inquiry), and transmits the setting information modified based on these points of difference to the inquiring information processing apparatus. The inquiring information processing apparatus carries out display based on the setting information received from the management apparatus. In other words, the setting information prepared in any information processing apparatus can be shared among all the information processing apparatuses within the system so that it can be used after reflecting in it the differences in capacity and functions between the information processing apparatus preparing the setting information and the using information processing apparatus.

Apart from a number unique to each apparatus, the device ID can also be a unique address allocated to it on the network (such as the MAC address), etc.

According to the another embodiment, in addition to storing the device information of each of the information processing apparatuses belonging to the system in the management apparatus while establishing correspondence with the device ID of that information processing apparatus, all the setting information prepared in each information processing apparatus, the user ID of the person preparing it, and device ID of the information processing apparatus in which that setting information was prepared are stored in the management apparatus while establishing the correspondence among them. Because of this, the correspondence of each of the setting information is established with the device information of the information processing apparatus in which it was prepared using the device ID as the key.

When an inquiry including a device ID and a user ID is sent to the management apparatus from any information processing apparatus, the management apparatus extracts the setting information corresponding to that user ID from among the stored setting information, and for each of the extracted setting information, the management apparatus identifies the points of difference, at the time of using the setting information, between the device information corresponding to the device ID associated with that setting information (the device information of the information processing apparatus in which that setting information was prepared) and the device information corresponding to the device ID included in the inquiry (the device information of the apparatus generating the inquiry), and transmits the setting information modified based on these points of difference to the inquiring information processing apparatus. The inquiring information processing apparatus carries out display based on the setting information received from the management apparatus. In other words, each user can use the setting information prepared by that user in any information processing apparatus in any information processing apparatus within the system after reflecting in it the differences in capacity and functions between the information processing apparatus preparing the setting information and the information processing apparatus using that setting information.

According to the above embodiment, when calling for the setting information controlled for each user by the management apparatus the user authentication is executed, and only when the authentication has succeeded, the usage of the setting information becomes possible. By this, the setting information set by each user is prevented from being used by the other user without permission.

According to the above embodiment, the user authentication information is any one of or combination of a password inputted on the operation panel of the information processing apparatus, authentication information obtained from the ID card inserted to the information processing apparatus, and biometric information obtained by the information processing apparatus.

Further, the user authentication method is not restricted to the above. For example, this can be a non-contact type authentication method using mobile telephones or RFID tags with authentication information recorded in them.

According to the above embodiment, the device information is attributes information unique to an information processing apparatus.

Here, the attributes information unique to an information processing apparatus includes, apart from the functions and capacity of the apparatus, the default values of the apparatus for the various parameters that are to be set.

According to the above embodiment, the presence or absence of modification and the contents of such processing made to the setting information sent from the management apparatus in response to an inquiry can be distinguished according to the inquiring information processing apparatus. For example, among the functions which were being used in the setting information before modification, if there are functions that are not used due to differences between the apparatuses, they are displayed in the grayed-out mode.

According to the above embodiment, the setting information after modification is stored additionally as a newly prepared setting information in the inquiring apparatus. In other words, the setting information after modification is registered while establishing correspondence with the device information of the inquiring information processing apparatus.

According to the above structure, the device information is updated upon being retransmitted from the information processing apparatus. Since the apparatus configuration, apparatus status, etc., of an information processing apparatus changes when some function has developed a fault or an optional function has been added, etc., it is updated appropriately due to retransmission from the information processing apparatus. It is desirable to carry out retransmission of the device information so that the latest state is stored in the management apparatus.

According to the above structure, even when there is a difference in the device information between the apparatus preparing the setting information and the apparatus using it, the setting information is modified so that the result of processing based on the setting information is not much different from that in the apparatus in which the setting information is prepared. Because of this, even when there is a difference in the functions and capacity of the apparatus, it is possible to use the setting information at the time of preparation in other apparatuses to the maximum limit.

According to the above embodiment, in the case when a function that was being used in the information processing apparatus used for preparing the setting information cannot be used in the inquiring information processing apparatus due to differences between the two information processing apparatuses, if an alternative function is present for the unusable function in the inquiring information processing apparatus, that alternative function will be used. Because of this, a similar processing result will be obtained although not the same as when using the original function. For example, among the functions of binding a document using staples, if "vertical stapling" cannot be done, it is possible to use "horizontal stapling". It is good to register in advance the relationship between each function and its alternative functions in the management apparatus.

According to the information processing system of the present embodiment, and information processing apparatus, management apparatus, even when there is difference in functions or capacity between the apparatuses, it is possible to share the setting information prepared in any apparatus so that it can be used in any other apparatus within the system.

In particular, when the setting information is managed separately for each user, each user can use the setting information prepared by that user in any information processing apparatus in any other information processing apparatus within the system after reflecting in the setting information the differences in the functions and capacity between the apparatus used for preparing the setting information and the apparatus using the setting information.

It is to be noted that various changes and modifications will be apparent to those skilled in the art. Therefore, unless such changes and modifications depart from the scope of the present invention, they should be construed as being included therein.

While the preferred embodiments of the present invention have been described using specific terms, such description is for illustrative purposes only, and it is to be understood that changes and variations may be made without departing from the spirit or scope of the appended claims.

What is claimed is:

1. An information processing system which processes information based on setting information, comprising:
   a first information processing apparatus and a second information processing apparatus; each having at least one of a facsimile function, a copying function, and a printing function; and
   a management apparatus to communicate with the first and the second information processing apparatus;
   wherein the first information processing apparatus comprises:
      a device information transmitting section which transmits a first device information of the first information processing apparatus to the management apparatus, wherein the first device information is attribute information representing capability of functions and kind of functions inherent to the first image processing apparatus; and
      a setting information transmitting section which transmits a first setting information set in the first information processing apparatus to the management apparatus, wherein the setting information is a job record of the first information processing apparatus set for executing at least one of a facsimile job, a copying job, and a printing job;
   wherein the management apparatus comprises:
      a device information storing section which stores the first device information received from the first information processing apparatus; and
      a setting information storing section which stores the first setting information received from the first information processing apparatus associated with the first device information;
   wherein the second information processing apparatus comprises:
      a device information transmitting section which transmits a second device information of the second information processing apparatus to the management apparatus, wherein the second device information is attribute information representing capability of functions and kind of functions inherent to the second image processing apparatus;
      an inquiry section which executes an inquiry about the first setting information of the job record stored in the setting information storing section to the management apparatus; and
      a display section which displays a result of the inquiry;
   wherein the management apparatus further comprises:
      a processing section which specifies a difference between the first device information and the second device information, when the management apparatus receives the inquiry from the second information processing apparatus, and modifies the first setting information of the job record in accordance with the difference such that the modified first setting information of the job record can be executed by the second information processing apparatus; and
      an information transmitting section which transmits a processed first setting information to the second information processing apparatus;
   wherein the display section of the second information processing apparatus displays the result of the inquiry based on the modified first setting information of the job record.

2. The information processing system of claim 1, wherein the processing section of the management apparatus adds an information identifying whether the setting information is processed or not, and a content of a processing by the processing section, and wherein the display section displays whether the setting information is processed or not, and the content of the processing.

3. The information processing system of claim 1, wherein the management apparatus stores the processed setting information associated with the device information of the second information processing apparatus into the setting information storing section.

4. The information processing system of claim 1, wherein the processing section of the management apparatus processes the setting information so as to minimize a difference between a result to be obtained when the first information processing apparatus processes the information based on the first setting information and a result to be obtained when the second information processing apparatus processes the information based on the processed setting information.

5. The information processing system of claim 1, wherein when a function of the first information processing apparatus is not available in the second information processing apparatus, the processing section of the management apparatus processes the first setting information so as to provide a substitute function for the unavailable function.

6. The information processing system of claim 1,
wherein the setting information transmitting section of the first information processing apparatus associates and transmits to the management apparatus the first setting information for each user and user ID of a user who set the first setting information,
wherein the inquiry section of the second information processing apparatus executes an inquiry, including user ID, about the first setting information stored in the setting information storing section to the management apparatus,
wherein the setting information storing section of the management apparatus stores the first setting information and the user ID received from the first information processing apparatus associated with the first device information, and
the processing section of the management apparatus extracts the first setting information associated with the user ID identical to the user ID included in the inquiry, and processes an extracted first setting information of the job record in accordance with the difference such that the processed setting information of the job record can be executed by the second information processing apparatus.

7. The information processing system of claim 6,
wherein the management apparatus stores the processed setting information associated with the user ID and the second device information of the second information processing apparatus into the setting information storing section.

8. An information processing system which processes information based on setting information, comprising:
a plurality of information processing apparatuses each having at least one of a facsimile function, a copying function, and a printing function; and
a management apparatus to communicate with the information processing apparatuses;
wherein each information processing apparatus comprises:
a device information transmitting section which transmits a device information of the information processing apparatus to the management apparatus wherein the device information is attribute information representing capability of functions and kind of functions inherent to the image processing apparatus;
a setting information transmitting section which transmits a setting information set in the information processing apparatus to the management apparatus wherein the setting information is a job record of the information processing apparatus set for executing at least one of a facsimile job, a copying job, and a printing job;
an inquiry section which executes an inquiry about the setting information stored in the setting information storing section to the management apparatus, and
a display section which displays a result of the inquiry;
wherein the management apparatus comprises:
a device information storing section which stores the device information received from the information processing apparatus; and
a setting information storing section which stores the setting information received from the information processing apparatus associated with the device information;

a processing section which specifies a difference between the device information stored in the device information storing section and the device information of the information processing apparatus which has executed the inquiry, when the management apparatus receives the inquiry from the information processing apparatus, and modifies the setting information of the job record in accordance with the difference such that the modified setting information of the job record can be executed by the information processing apparatus which has executed the inquiry; and
an information transmitting section which transmits the processed setting information to the information processing apparatus which has executed the inquiry;
wherein the display section of the information processing apparatus which has executed the inquiry displays the result of the inquiry based on the modified setting information.

9. The information processing system of claim 8,
wherein the processing section of the management apparatus adds an information identifying whether the setting information is processed or not, and a content of a processing by the processing section, and
wherein the display section displays whether the setting information is processed or not, and the content of the processing.

10. The information processing system of claim 8, wherein the management apparatus stores the processed setting information associated with the device information of the information processing apparatus, which has executed the inquiry, into the setting information storing section.

11. The information processing system of claim 8,
wherein the processing section of the management apparatus processes the setting information so as to minimize a difference between a result to be obtained when the information processing apparatus, having set the setting information, processes the information based on the setting information and a result to be obtained when the information processing apparatus, having executed the inquiry, processes the information based on the processed setting information.

12. The information processing system of claim 8,
herein when a function of the information processing apparatus, having set the setting information, is not available in the information processing apparatus, having executed the inquiry, the processing section of the management apparatus processes the setting information so as to provide a substitute function for the unavailable function.

13. The information processing system of claim 8,
wherein the setting information transmitting section of the information processing apparatus associates and transmits to the management apparatus the setting information for each user and user ID of a user who set the setting information,
wherein the inquiry section of the information processing apparatus executes an inquiry, including user ID, about the setting information stored in the setting information storing section to the management apparatus,
wherein the setting information storing section of the management apparatus stores the setting information and the user ID received from the information processing apparatus associated with the first device information, and
the processing section of the management apparatus extracts the setting information of the job record associated with the user ID identical to the user ID included in the inquiry, when the management apparatus receives the inquiry from the information processing apparatus, and processes an extracted setting information in accordance with the difference such that the processed setting information of the job record can be executed by the information processing apparatus which has executed the inquiry.

14. The information processing system of claim 13, wherein the management apparatus stores the processed setting information associated with the user ID and the device information of the information processing apparatus the inquiry, into the setting information storing section.

15. An information processing system which processes information based on setting information, comprising:
a plurality of information processing apparatuses each having at least one of a facsimile function, a copying function, and a printing function; and
a management apparatus to communicate with the information processing apparatuses;
wherein each information processing apparatus comprises:
a device information transmitting section which transmits a device information of the information processing apparatus and device ID to the management apparatus wherein the device information is attribute information representing capability of functions and kind of functions inherent to the image processing apparatus;
a setting information transmitting section which transmits a setting information set in the information processing apparatus and device ID to the management apparatus wherein the setting information is a job record of the information processing apparatus set for executing at least one of a facsimile job, a copying job, and a printing job;
an inquiry section which executes an inquiry, including the device ID, about the setting information stored in the setting information storing section to the management apparatus; and
a display section which displays a result of the inquiry;
wherein the management apparatus comprises:
a device information storing section which stores the device information and the device ID received from the device information transmitting section; and
a setting information storing section which stores the setting information and the device ID received from the setting information transmitting section associated with the device information;
a processing section which specifies a difference between the device information corresponding to the device ID stored in the device information storing section and the device information corresponding to the device ID included in the inquiry, when the management apparatus receives the inquiry from the information processing apparatus, and modifies the setting information of the job record in accordance with the difference such that the modified setting information of the job record can be executed by the information processing apparatus which has executed the inquiry; and
an information transmitting section which transmits a modified setting information to the information processing apparatus which has executed the inquiry;
wherein the display section of the information processing apparatus which has executed the inquiry displays the result of the inquiry based on the modified setting information.

16. The information processing system of claim 15,
wherein the processing section of the management apparatus adds an information identifying whether the setting information is processed or not, and a content of a processing by the processing section, and
wherein the display section displays whether the setting information is processed or not, and the content of the processing.

17. The information processing system of claim 15,
wherein the management apparatus stores the processed setting information associated with the device information of the information processing apparatus, which has executed the inquiry, into the setting information storing section.

18. The information processing system of claim 15,
wherein the processing section of the management apparatus processes the setting information so as to minimize a difference between a result to be obtained when the information processing apparatus, having set the setting information, processes the information based on the setting information and a result to be obtained when the information processing apparatus, having executed the inquiry, processes the information based on the processed setting information.

19. The information processing system of claim 15,
wherein when a function of the information processing apparatus, having set the setting information, is not available in the information processing apparatus, having executed the inquiry the processing section of the management apparatus processes the setting information so as to provide a substitute function for the unavailable function.

20. The information processing system of claim 15,
wherein the setting information transmitting section of the information processing apparatus associates and transmits to the management apparatus the setting information for each user and user ID of a user who set the setting information,
wherein the inquiry section of the information processing apparatus executes an inquiry, including user ID, about the setting information stored in the setting information storing section to the management apparatus,
wherein the setting information storing section of the management apparatus stores the setting information and the user ID received from the information processing apparatus associated with the device information, and
the processing section of the management apparatus extracts the setting information of the job record associated with the user ID identical to the user ID included in the inquiry, when the management apparatus receives the inquiry from the information processing apparatus, and modifies an extracted setting information of the job record in accordance with the difference such that the modified setting information of the job record can be executed by the information processing apparatus which has executed the inquiry.

21. The information processing system of claim 20, wherein the management apparatus stores the processed setting information associated with the user ID and the device information of the information processing apparatus, which has executed the inquiry, into the setting information storing section.

* * * * *

UNITED STATES PATENT AND TRADEMARK OFFICE
CERTIFICATE OF CORRECTION

PATENT NO.       : 7,624,186 B2
APPLICATION NO. : 11/297930
DATED            : November 24, 2009
INVENTOR(S)      : Mio Tanida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this

Twenty-sixth Day of October, 2010

David J. Kappos
*Director of the United States Patent and Trademark Office*